Aug. 29, 1967 W. A. TURUNEN ETAL 3,338,300
PURGING SEAL
Filed Dec. 16, 1966
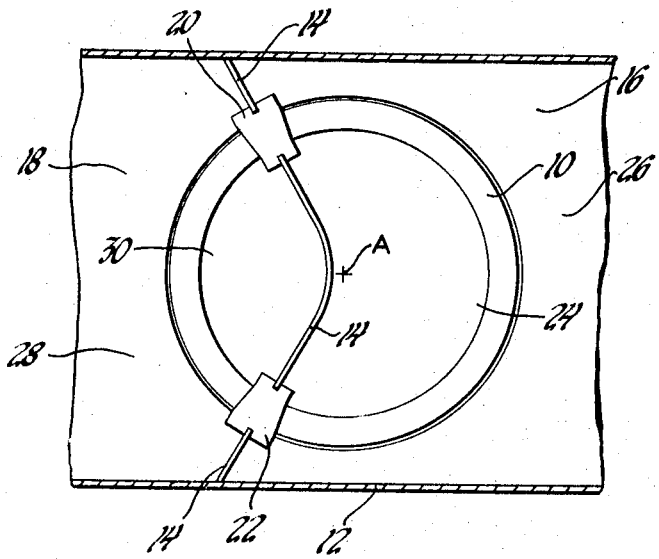
Fig.1
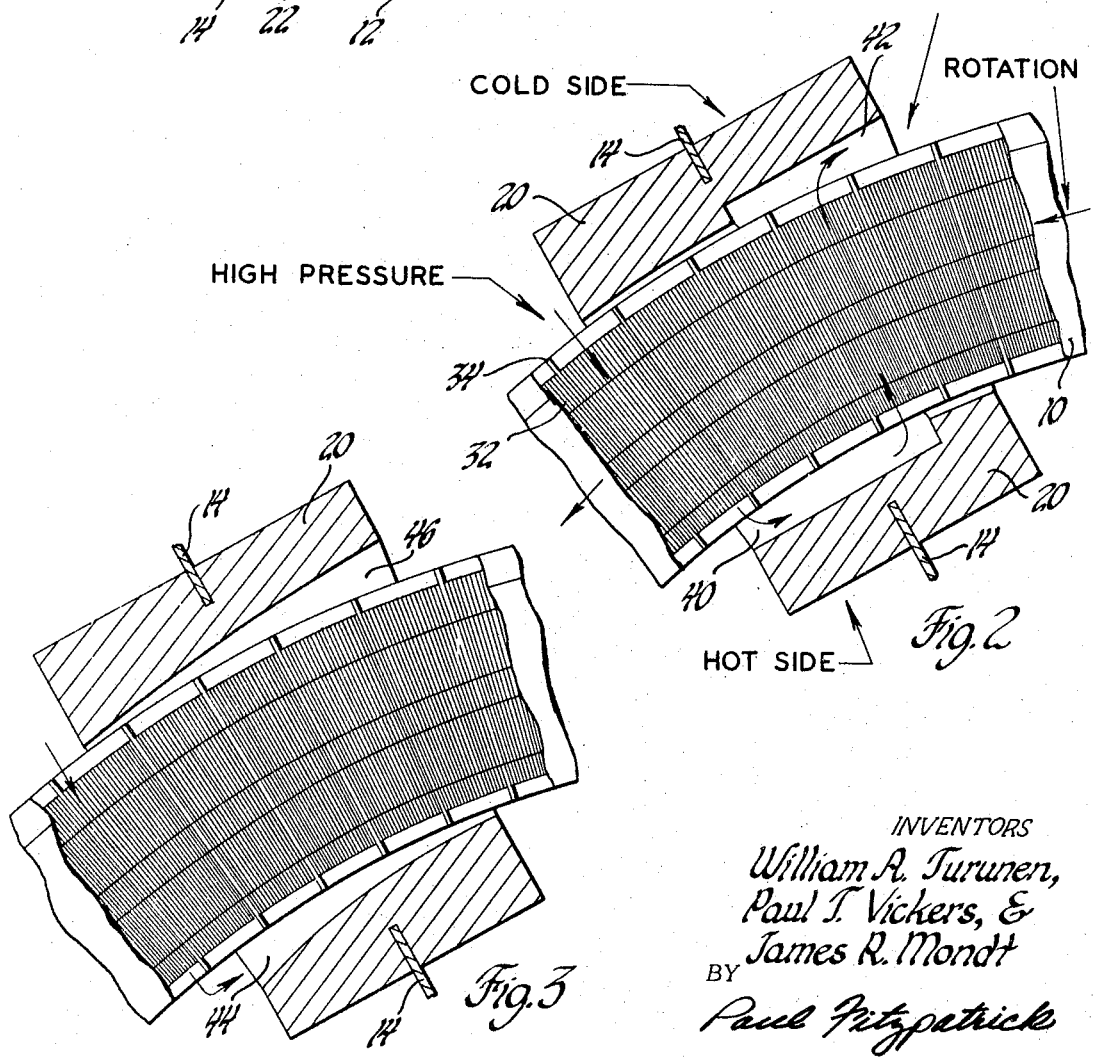
Fig.2
Fig.3
INVENTORS
William A. Turunen,
Paul T. Vickers, &
BY James R. Mondt
Paul Fitzpatrick
ATTORNEY United States Patent Office 3,338,300
Patented Aug. 29, 1967

3,338,300
PURGING SEAL
William Andrew Turunen, Birmingham, Paul Thomas Vickers, Royal Oak, and James Robert Mondt, Warren, Mich., assignors to General Motors Corporation, Detroit, Mich., a corporation of Delaware
Filed Dec. 16, 1966, Ser. No. 611,509
4 Claims. (Cl. 165—5)

ABSTRACT OF THE DISCLOSURE

A main seal arrangement in a rotary regenerator to prevent carry-over of the lower pressure fluid into the higher pressure fluid by the matrix. Labyrinth seals cooperating with the faces have reversely varying clearances so the high pressure fluid will leak through the matrix from face to face within the seal and purge the lower pressure fluid into the lower pressure space.

This application is a continuation-in-part of our application for Purging Seal, Ser. No. 425,461, filed Jan. 14, 1965, now abandoned.

Our invention relates to rotary regenerators, that is devices in which a porous annular body, called a matrix, rotates slowly so that each part of the matrix passes alternately through two spaces where it is exposed to gases at different temperatures and at different pressures, the matrix carrying heat from the hotter to cooler gas. In such devices, a seal is provided where the matrix passes from one space to the other through a diaphragm or bulkhead. Sealing is one of the difficult problems in such regenerators, particularly where there is a considerable pressure drop from one space to the other. The effective sealing of such devices also may be seriously hampered by displacement losses due to the carrying of gas from one space to the other within the porous structure of the rotating matrix. This rotation carry-over results in the contamination of the high pressure space with low pressure gas and of the low pressure space with a high pressure gas. Our invention is directed to an arrangement to eliminate the carrying over of gas by the matrix from the lower pressure space to the higher pressure space. This is quite significant in installations where contamination of the higher pressure gas with lower pressure gas should not be allowed.

Hence, our invention presents a self-purging seal assembly for use with a rotary regenerator at the point where the rotary regenerator rotates from the low pressure space to the high pressure space which purges the regenerator matrix to eliminate contamination of the high pressure gas with the low pressure gas. Our invention accomplishes this by having the regenerator seal vary reversely in clearance in the circumferential direction at the opposite faces of the matrix so that high pressure gas is caused to flow along the rotating regenerator toward the low pressure space and then is forced to flow through the rotating regenerator within the sealing means thereby purging from the regenerator matrix the low pressure gas which is undergoing rotation with the matrix as a carry-over. This self-purging effect eliminates the possible contamination of the high pressure gas with the low pressure gas.

Other objects, features, and advantages of the subject invention will become apparent upon reference to the following detailed description of preferred embodiments of the invention and the corresponding drawings.

FIGURE 1 is a schematic cut-away view of a rotary regenerator embodying the invention, the view being taken on a plane perpendicular to the axis of rotation.

FIGURE 2 is an enlarged sectional view of a regenerator seal assembly, with clearances greatly exaggerated.

FIGURE 3 is an enlarged sectional view of an alternate embodiment of the regenerator seal assembly, with clearances greatly exaggerated.

More particularly, FIGURE 1 shows the subject invention as embodied within a rotary regenerator including a matrix 10 which rotates about an axis A and is suitably supported within a housing 12. The matrix 10 rotates in a counterclockwise direction as illustrated. A bulkhead 14 divides the space within the housing 12 into two main plenums 16 and 18. Sealing means 20 and 22 are provided within the bulkhead 14 at the points where the matrix 10 rotates through the bulkhead so that the plenums 16 and 18 are sealingly separated. The plenum 16 contains hot, lower pressure gas which will enter the plenum 16 within the matrix 10 and pass from the space 24 through the matrix 10 to the outer space 26, thereby heating the matrix 10 as it rotates through the low pressure plenum 16. The high pressure plenum 18 contains cool higher pressure gas which enters the outer chamber 28 and passes from the matrix 10 into the inner chamber 30 within the matrix 10. Hence, it can be seen that the heat of the hot gases is used to heat the matrix as it rotates through the low pressure plenum 16 and that this heat is transferred to the cooler higher pressure gas as the matrix 10 rotates through the high pressure plenum 18. It should be noted that it is immaterial to the invention which gas is hot and which gas is cool.

FIGURE 2 shows an enlarged view of the subject invention as embodied in a sealing means 20 and its relation to the matrix 10. The matrix 10 is rotating counterclockwise in FIGURE 2, the high pressure plenum 18 is located on the left of bulkhead 14, and low pressure plenum 16 is on the right. The lower pressure gases pass from the chamber 24 radially outward through the matrix 10 to the lower pressure chamber 26. It can readily be seen that a portion of the low pressure gas which passes from the chamber 24 into the matrix 10 before the matrix rotates into the seal 20 will, with prior seals, be carried through the seal within the porous matrix structure and delivered in the high pressure plenum 18. This movement of low pressure gas is referred to as a displacement loss and results in the contamination of the high pressure gas within the high pressure plenum 18. As mentioned previously, it is the object of the invention to eliminate this displacement loss and the resulting contamination.

The matrix 10 may be of any suitable type having a plurality of heat exchange segments 32 alternated with sealing bars 34. The heat exchange segments may be constructed of a suitable material, such as tightly packed layers of corrugated sheet metal, which provides radial flow paths with substantial heat exchange surface area. It is to be noted that the sealing bars 34 extend radially beyond both faces of the matrix 10, such that they normally are in sealing relation, as close as feasible to actual contact, with the stationary seal 20. Such main seals including labyrinth seal structure are disclosed in such prior art as U.S. Patents to Bubniak et al., No. 2,888,248, No. 3,057,604, and No. 3,181,603; and to Mondt, No. 3,186,479. In these devices, the labyrinth seal is intended to have the minimum feasible clearance at all points.

In the subject invention, the seal 20 has undercut portions 40 and 42, which overlap slightly, on opposite sides of the matrix 10. Since the outer chamber 28 is at a higher pressure than the inner chamber 30, the high pressure gas is caused to flow through the matrix 10 to the chamber 30. Then, since the chamber 30 is at a higher pressure than the chamber 24, the high pressure gas is forced to flow into the undercut portion 40 in a direction toward the chamber 24 and further since the chamber 26 is at a lower pressure than the chamber 24, the high pressure gas in induced to flow from the undercut portion 40 through the matrix 10 to the undercut portion 42 and into the chamber 26. Hence, the undercut portions 40 and 42 of the sealing means 20 provide a flow path for the high pressure gas to go from the chamber 30 through the matrix 10 to the chamber 26. Hence the low pressure gas, which has been trapped and rotated by matrix 10, is purged from the matrix 10 by the high pressure gas before it can reach the high pressure plenum 18. As a result, the seal provides a means whereby the high pressure gas is used to purge the low pressure gas from the matrix 10 prior to its reaching the high pressure plenum 18 thereby eliminating the possibility of contamination of the high pressure gas. It should be noted that the location of the undercut portions 40 and 42 may be reversed so that portion 42 is adjacent the high pressure side and portion 40 is adjacent the low pressure side. The device should work equally well this way as long as proper pressure differentials are maintained across the matrix.

It should be understood that the seal clearances are grossly exaggerated in FIGURE 2. There is a labyrinth seal action across the entire width in the circumferential direction around the matrix, of the seal. However, in the undercut areas the clearance is greater and the pressure drop therefore lower. Thus, the pressure at the middle of the seal is sufficiently greater at the inner face of the matrix than at the outer face to cause the purging flow. Obviously, no very great flow is required for the purging.

The alternative embodiment shown in FIGURE 3 is essentially the same as that shown in FIGURE 2 with the exception that the undercut portions 44 and 46 are of a different shape than that in the FIGURE 2 embodiment. As seen in FIGURE 3, the undercut portions 44 and 46 are tapered in order to gradually force the high pressure gas to flow through the matrix 10, thereby providing a flow path for the high pressure gas to go from the chamber 30 to the chamber 26. This configuration can be accomplished by tilting the seal with respect to the regenerator. As before, the seal clearances are greatly exaggerated.

It should again be mentioned that in both embodiments the undercut portions should be calibrated so that there is no undue loss or waste. The quantity of clear gas required to displace the contaminant gas from the matrix and the clearance of the undercut portions necessary to supply this amount may be determined by calculation or experiment. The action of the device may be clarified to some extent by consideration of the arrows in FIGURE 2 which indicate flow. As indicated by the arrows, the clean gas flows radially inward through the matrix to the left of the seal 20, and a small part of it is forced through the undercut portion 40. Because of the upward pressure drop through the matrix within the seal this clean gas is forced through the matrix to the undercut portion 42 thereby expelling contaminant gas ahead of it. As will be apparent, if the flow of clean gas is insufficient, not all of the contaminant gas will be expelled. On the other hand, if an excess of clean gas is supplied, an undesirable quantity of clean gas will be blown into the space 26 above the matrix. For best results, a flow of clean gas slightly in excess of the amount of contaminant gas in the matrix should be maintained.

Although but two specific embodiments of the subject invention have been described and shown in detail, it should be clear to those skilled in the art to which the invention pertains, that many changes and modifications may be made thereto without departing from the scope of the invention.

We claim:
1. A rotary regenerator comprising, in combination,
a housing,
a bulkhead dividing the housing into two flow paths, a first flow path for a first fluid and a second flow path for a second fluid, the first fluid being at higher pressure than the second fluid
a matrix rotatably mounted in the housing and rotating through said bulkhead, the matrix being disposed across both said flow paths so that both fluids flow through said matrix, one on each side of said bulkhead
fixed seal means disposed in said bulkhead where the matrix moves from the second flow path into the first flow path
the matrix and fixed seal means including means defining a labyrinth seal between the two flow paths across both the faces of the matrix through which the fluids flow
the clearance of the labyrinth seal varying circumferentially of the matrix in opposite sense at the two faces of the matrix thereby establishing a pressure differential between the two faces of the matrix within the seal resulting from differential attenuation of the pressure of the first fluid circumferentially of the matrix as it leaks through the respective sides of the labyrinth seal
the first fluid being impelled to flow through the matrix and purge the matrix of the second fluid within the seal by the said pressure differential.
2. A regenerator as recited in claim 1 in which the labyrinth seal clearance varies progressively.
3. A regenerator as recited in claim 1 in which the laybrinth seal clearance at each face of the matrix has a step change between a portion of greater clearance and a portion of lesser clearance.
4. A regenerator as recited in claim 3 in which the portions of greater clearance of the labyrinth seal overlap circumferentially of the matrix.

References Cited

UNITED STATES PATENTS

| | | | |
|---|---|---|---|
| 1,586,817 | 6/1926 | Ljungstrom | 165—8 |
| 2,865,611 | 12/1958 | Bentele | 165—9 |

FOREIGN PATENTS 1,156,430  10/1963  Germany.

MEYER PERLIN, *Primary Examiner.*

ALBERT W. DAVIS, *Assistant Examiner.*